UNITED STATES PATENT OFFICE.

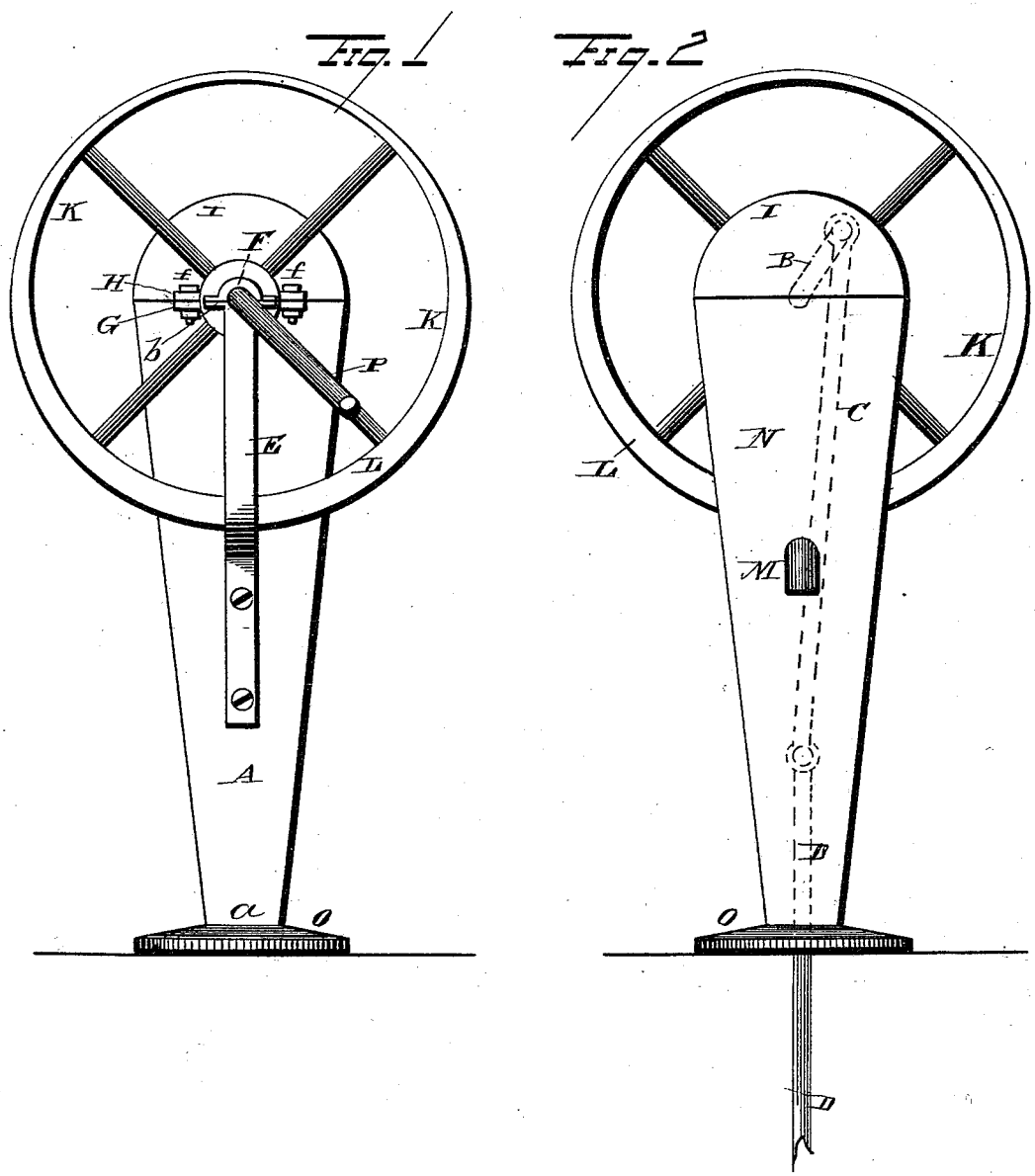

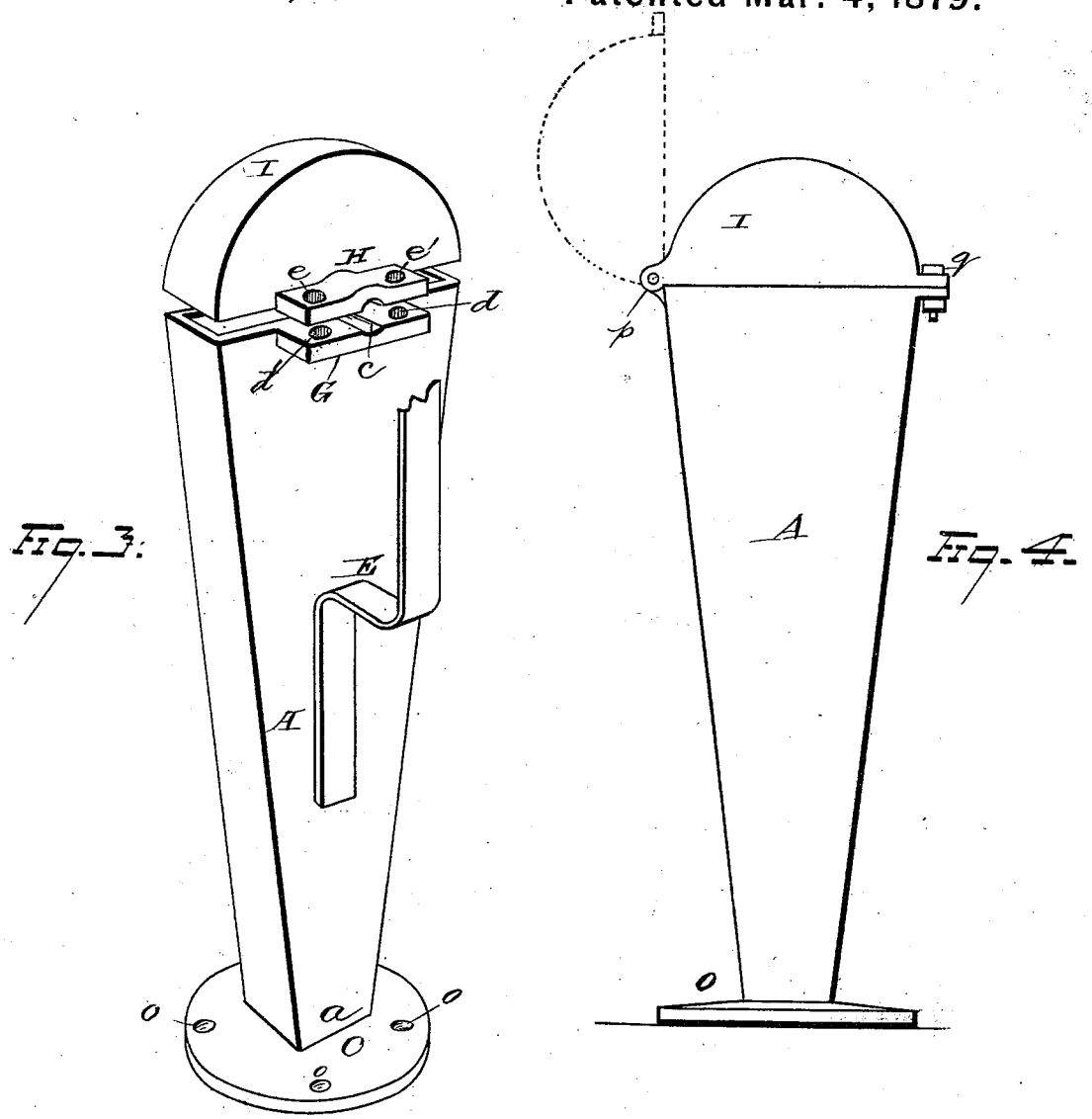

JAMES W. ROBERTSON, OF FRIEND, NEBRASKA.

IMPROVEMENT IN PUMPS.

Specification forming part of Letters Patent No. 212,985, dated March 4, 1879; application filed January 11, 1879.

*To all whom it may concern:*

Be it known that I, JAMES W. ROBERTSON, of Friend, in the county of Saline and State of Nebraska, have invented certain new and useful Improvements in Pumps; and I do hereby declare the following to be a full, clear, and exact description of the invention, such as will enable others skilled in the art to which it pertains to make and use it, reference being had to the accompanying drawings, which form part of this specification.

My invention relates to an improvement in pumps; the object being to provide a pump casing or chamber of such construction that the crank to which the connecting-rod is attached may be completely inclosed within said chamber, whereby the upper portion of the latter may serve as an air-chamber to regulate the flow of water.

My invention consists in certain details in construction and combinations of parts, as will be hereinafter described, and pointed out in the claim.

In the accompanying drawings, Figure 1 is a side elevation of my invention. Fig. 2 is a similar view, showing the reverse side of the pump. Fig. 3 is a view, in perspective, of the same. Fig. 4 is a modification.

A represents the casing or chamber of a pump, the lower end, a, of which but slightly exceeds in size the pump-stock, while the chamber gradually increases in width from the bottom to the top, which latter is of sufficient width to allow of the rotation of the crank-arm B. Connecting-rod C is journaled at its upper end upon the crank B, and its lower end attached to the upper end of the pump-rod D.

A bracket, E, is secured at its lower end to the side of the pump-chamber by screws, bolts, or in any suitable manner. The upper end of bracket E is provided with a journal-box, b, within which is placed the outer end of crank-shaft F. The opposite end of crank-shaft F is supported in a bearing, c, formed in the flange G, which extends outwardly from the side of the pump-casing, and is cast solid therewith.

Flange G is provided with perforations d d', which register with holes e e', formed in the outwardly-projecting flange H, cast solid with the cover I, and thus, by bolts f, extending through the holes in flanges G H, the cover is firmly secured to the casing, and the upper and lower crank-shaft bearings caused to fit snugly upon the crank-shaft.

K is a balance-wheel, mounted upon crank-shaft F intermediate the bracket and side of the pump-casing. Balance-wheel K is provided with an unevenly-weighted rim, L, the inner periphery of the wheel being formed eccentric with its outer periphery, and the wheel secured to the crank-shaft in such position that the crank will stand on its quarter-turn when the pump is not in operation, so that the crank cannot stop on its dead-center; and, further, the weight upon one side of the wheel assists in counterbalancing the weight of the column of water being raised, thus equalizing the action of the operating parts of the pump when in use.

M is the discharge-spout, which is located at about the vertical center of the chamber A. When the cover is tightly secured upon the chamber A, an air-chamber, N, will be formed above the discharge-spout, which will serve as a cushion to receive the water as it is being raised, and prevent sudden shocks and blows, which are often occasioned in absence of a superposed air-chamber. Any suitable packing, such as a leather or rubber gasket, may be interposed between the cover and chamber to pack the joint air-tight, and thus insure an effective air-chamber in the upper portion of the pump, and also serve to prevent cold air from entering the chamber and freezing the water therein.

The lower end of chamber A is provided with an enlarged base, O, which is cast solid with the chamber, and furnished with perforations o, to allow the same to be firmly secured to any suitable foundation. Base O should be made of equal width of the top of the chamber, to prevent any rocking movement of the latter when the crank is operated.

P is the hand-crank, and may be of any desired form and construction.

Fig. 4 illustrates another form of cover, one end of the same being hinged at p, and the opposite end secured by bolt q, or in any other secure and convenient manner.

My improved pump-chamber is of small initial cost, as it may be cast in two sections complete, and, owing to its form and construction, the crank-connections are wholly inclosed therein, and a firm support is given the balance-wheel when the pump is in operation.

Having fully described my invention, what I claim as new, and desire to secure by Letters Patent, is—

The combination, with the pump chamber or casing, the base and cover cast solid in two separate pieces, of a crank located within the chamber, and a balance-wheel attached to the crank-shaft between the pump-chamber and a supporting-bracket, substantially as set forth.

In testimony that I claim the foregoing I have hereunto set my hand this 31st day of December, 1878.

JAMES W. ROBERTSON.

Witnesses:
ALEX. NEILSON,
C. E. FRIEND.